(12) United States Patent
Asheghi et al.

(10) Patent No.: US 12,274,974 B2
(45) Date of Patent: Apr. 15, 2025

(54) CONTINUOUSLY-CYCLED WATER HARVESTING FOR DRY COOLING TOWER OPERATED POWER PLANTS

(71) Applicant: The Board of Trustees of the Leland Stanford Junior University, Stanford, CA (US)

(72) Inventors: Mehdi Asheghi, Oakland, CA (US); Kenneth E. Goodson, Portola Valley, CA (US); Alexandros Terzis, Salonika (GR); Juan G. Santiago, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 265 days.

(21) Appl. No.: 17/764,800

(22) PCT Filed: Sep. 30, 2020

(86) PCT No.: PCT/US2020/053568
§ 371 (c)(1),
(2) Date: Mar. 29, 2022

(87) PCT Pub. No.: WO2021/067454
PCT Pub. Date: Apr. 8, 2021

(65) Prior Publication Data
US 2022/0370951 A1 Nov. 24, 2022

(51) Int. Cl.
*B01D 53/02* (2006.01)
*B01D 53/12* (2006.01)
(Continued)

(52) U.S. Cl.
CPC ........... *B01D 53/12* (2013.01); *B01D 53/261* (2013.01); *B01D 53/28* (2013.01);
(Continued)

(58) Field of Classification Search
CPC .......... B01D 2253/204; B01D 2257/80; B01D 2259/4009; B01D 53/12; B01D 53/261; B01D 53/28; Y02A 20/00
See application file for complete search history.

(56) References Cited

U.S. PATENT DOCUMENTS 5,160,512 A   11/1992  Talu
6,863,711 B2   3/2005  Tongue
(Continued)

FOREIGN PATENT DOCUMENTS

WO   WO2019152962   8/2019

OTHER PUBLICATIONS

Terzis et al., "High-Frequency Water Vapor Sorption Cycling Using Fluidization of Metal-Organic Frameworks", May 2020, Cell Reports Physical Science 1, 100057.
(Continued)

*Primary Examiner* — Christopher P Jones (57) ABSTRACT

A first aspect of this work relates to water harvesting in power plants. A water adsorbent material is driven through adsorption-desorption cycles using waste heat from a power plant to harvest water from ambient air. In a preferred embodiment, metal-organic-framework (MOF) powders are used as the water adsorbent material for this application. A second aspect of this work relates more generally to rapid adsorption-desorption cycling of MOFs for various applications.

3 Claims, 6 Drawing Sheets

(51) Int. Cl.
*B01D 53/26* (2006.01)
*B01D 53/28* (2006.01)

(52) U.S. Cl.
CPC .... *B01D 2253/204* (2013.01); *B01D 2257/80* (2013.01); *B01D 2259/4009* (2013.01)

(56) References Cited

U.S. PATENT DOCUMENTS

| | | |
|---|---|---|
| 8,584,480 B1 | 11/2013 | Butkus |
| 2015/0344364 A1 | 12/2015 | Bazer-Bachi |
| 2020/0398214 A1* | 12/2020 | Lackner ................ B01D 53/08 |

OTHER PUBLICATIONS

Luz et al., "Flying MOFs: polyamine-containing fluidized MOF/SiO2 hybrid materials for CO2 capture from post-combustion flue gas", 2018, Chem. Sci., 9, 4589-4599.
Morrow et al., "Water Recovery Using Waste Heat from Coal Fired Power Plants", 2011, SAND2011-0258.
Kim et al., "Adsorption-based atmospheric water harvesting device for arid climates", 2018, Nature Communications 9:1191.
Hanikel et al., "Rapid Cycling and Exceptional Yield in a Metal-Organic Framework Water Harvester", 2019, ACS Cent. Sci., 5, 1699-1706.
Xu et al., "Metal!Organic Frameworks for Water Harvesting from Air, Anywhere, Anytime", 2020, ACS Cent. Sci., 6, 1348-1354.
Tu et al., "Progress and Expectation of Atmospheric Water Harvesting", 2018, Joule v2, 1452-1475.

* cited by examiner

CONTINUOUSLY-CYCLED WATER HARVESTING FOR DRY COOLING TOWER OPERATED POWER PLANTS

FIELD OF THE INVENTION

This invention relates to water harvesting in power plants and more generally to rapid adsorption-desorption cycling.

BACKGROUND

Power plants consume massive amounts of water for cooling requirements. In a water-constrained world, alternative water resources are thus a necessity. Atmospheric water in the form of vapor and droplets in the atmosphere is a resource equivalent to about 10% of all fresh water in lakes on the Earth. Common atmospheric water harvesting technologies include moist air dewing, fog capture, and condensation via cooled coils. Such technologies are either energy intensive (e.g. running refrigeration cycle) or require relatively high humidity to avoid poor condensation performance. Current approaches are therefore energetically and/or economically unfavorable for large-scale energy engineering applications with significant flow requirements. To realize the vast potential of atmospheric water harvesting, a system capable of reversible cycles per day coupled with dry condensation must be designed. The operation of power plants can be therefore economically improved since atmospheric water can be harvested, reducing need for water. Accordingly, it would be an advance in the art to provide improved power plant water harvesting.

SUMMARY

A first aspect of this work relates to water harvesting in power plants. A water adsorbent material is driven through adsorption-desorption cycles using waste heat from a power plant to harvest water from ambient air. In a preferred embodiment, metal-organic-framework (MOF) powders are used as the water adsorbent material for this application. A second aspect of this work relates more generally to rapid adsorption-desorption cycling of MOFs for various applications.

DETAILED DESCRIPTION

A) General Principles

A first aspect of this work relates to water harvesting in power plants. In a preferred embodiment, metal-organic-framework (MOF) powders are used as a water adsorbent material in this context. A second aspect of this work relates more generally to rapid adsorption-desorption cycling of MOFs for various applications.

A1) Power Plant Water Harvesting

A1a) Summary

Power plants consume massive amounts of water for cooling requirements. E.g., in 2015, water withdrawals for thermoelectric power in US were estimated about 133 billion gallons per day, 72% of which was from freshwater resources. In a water-constrained world, alternative water resources are thus a necessity.

Atmospheric water in the form of vapor and droplets in the atmosphere is a resource equivalent to about 10% of all fresh water in lakes on the Earth. Common atmospheric water harvesting technologies include moist air dewing, fog capture, and condensation via cooled coils. Such technologies are either energy intensive (e.g. running refrigeration cycle) or require relatively high humidity to avoid poor condensation performance. Current approaches are therefore energetically and/or economically unfavorable for large-scale energy engineering applications with significant flow requirements. To realize the vast potential of atmospheric water harvesting, a system capable of reversible cycles per day coupled with dry condensation must be designed. The operation of power plants can be therefore economically improved since atmospheric water can be harvested, reducing need for water.

Continuously-cycled water harvesting from the atmosphere system is provided to improve the performance of power cycle dry cooling towers for more energy efficient and environmentally friendly operation. This novel design leverages an adsorption-based mass transfer unit that extracts water vapor from air and makes available liquid water to humidify the cooling stream of a dry cooling tower during operation at the hottest and driest days of the year.

This method captures atmospheric water in a scalable fluidized-bed with a water absorbent material, e.g. metal-organic-frameworks (MOFs) powders, silica gel particulates or other sorbents etc. Preliminary experiments have been carried out using ambient air drawn into the fluidized-bed and water vapor adsorbed into the solid particulates. Once the sorbent particulates are saturated, water vapor is released (desorption) using heated air. This heated air models the air stream which would come from low-grade waste heat from the condenser of a dry-cooling tower power plant. The humidified air is then drawn in a dry condenser to produce liquid water at atmospheric conditions.

There is a good synergy in combining these cycled water absorption and cooling tower technologies. Namely, the water harvested during night-time operation can be utilized to improve the power cycle efficiency of the power plant during day-operation, particularly in very hot and dry days. This design is a new research concept at the nexus of energy, water, and the environment. This could be indeed an application for the proposed continuously cycled water harvesting technology reducing the water consumption of power plants.

Water vapor absorbent materials, like porous metal-organic-frameworks (MOFs), are very promising materials for reversible atmospheric water harvesting. Proof of concept experiments have implemented vapor adsorption by surface diffusion and desorption utilizing incident solar flux as the heat source, followed by wet condensation of the vapor to harvest water. However, these designs have achieved cycle periods of a few hours or more. A key reason for this limitation is that the time scales of heat and mass diffusion into even 1 to 5 mm thick MOF layers are a fundamental barrier to rapid absorption/desorption. The throughput of these systems is limited to about 0.8 L/day of water per kilogram of MOFs for a few cycles at 30% RH or once-cycle at 60% RH. For MOF-based water harvesting schemes to be energetically efficient and economically viable, the throughput must be increased to more than 100 L/day of water per kilogram of MOFs along with significant reduction in capital investment and operational cost.

The maximal surface-area and rapid mass transfer enabled by fluidization of MOFs (or other water vapor absorbent materials) is a solution for scalable and relatively high-frequency cycle operation of up to 50 to 100 cycles per day, increasing dramatically the throughput of the system. Section B herein describes this in greater detail. Further, fluidized-beds have been shown to be scalable in wastewater treatment and petrochemical industry; however, they have not been applied to rapid adsorption/desorption using MOF type adsorbents, and have not been applied to cooling applications.

A1b) Exemplary Embodiments

Figure 1A:
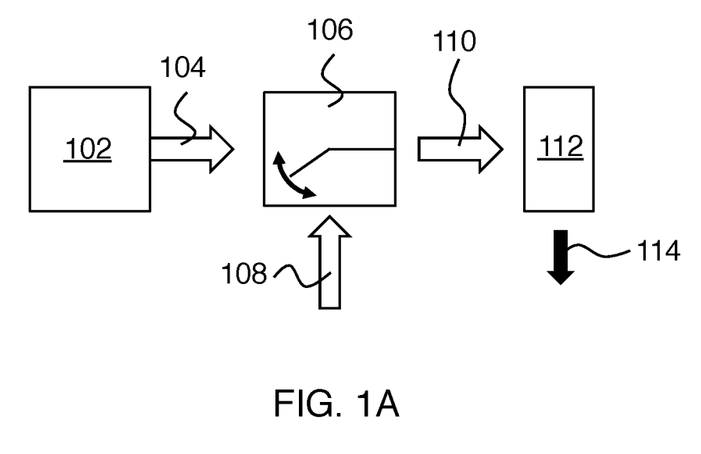
FIGS. 1A-B show two embodiments of a first aspect of the invention.

FIG. 1A shows a first exemplary embodiment of the invention. In this example, a heat engine 102 (e.g., a power plant) has a waste heat gas output 104. An adsorption/desorption device 106 is provided that has an input and a gas flow through it. Adsorption/desorption device 106 has two modes: adsorption and desorption. In the adsorption mode, adsorption/desorption device 106 removes water vapor from the gas flow by adsorption. In the desorption mode, adsorption/desorption device 106 adds water vapor to the gas flow by desorption. The input to adsorption/desorption device 106 depends on the mode—the input is ambient air 108 in the adsorption mode and the input is waste heat gas output 104 in the desorption mode. Cycling between these two modes is schematically shown on FIG. 1A within the block for adsorption/desorption device 106. Practice of the invention does not depend critically on whether the gas flow switching is done within adsorption/desorption device 106 as shown on FIG. 1A, or in an external gas flow control system (as in the example of FIG. 2). A heat exchanger 112 receives an output gas flow 110 from adsorption/desorption device 106 during the desorption mode and is configured to condense and recover liquid water 114 from the output gas flow.

Figure 1B:
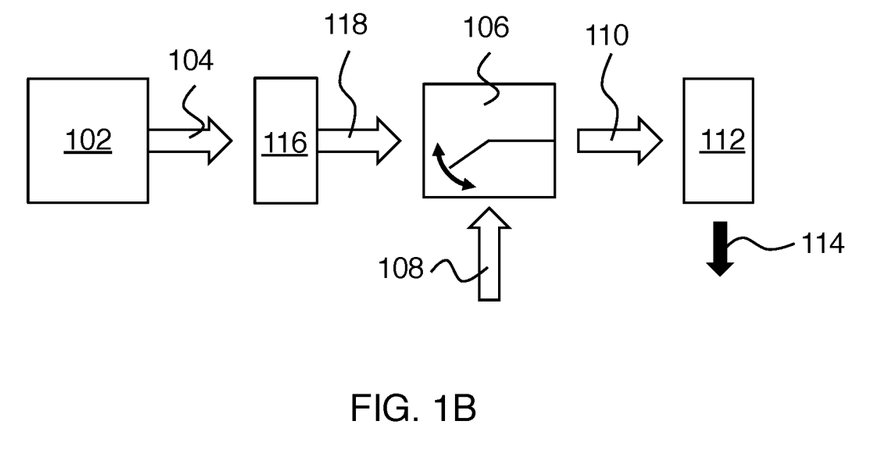
Figure 2:
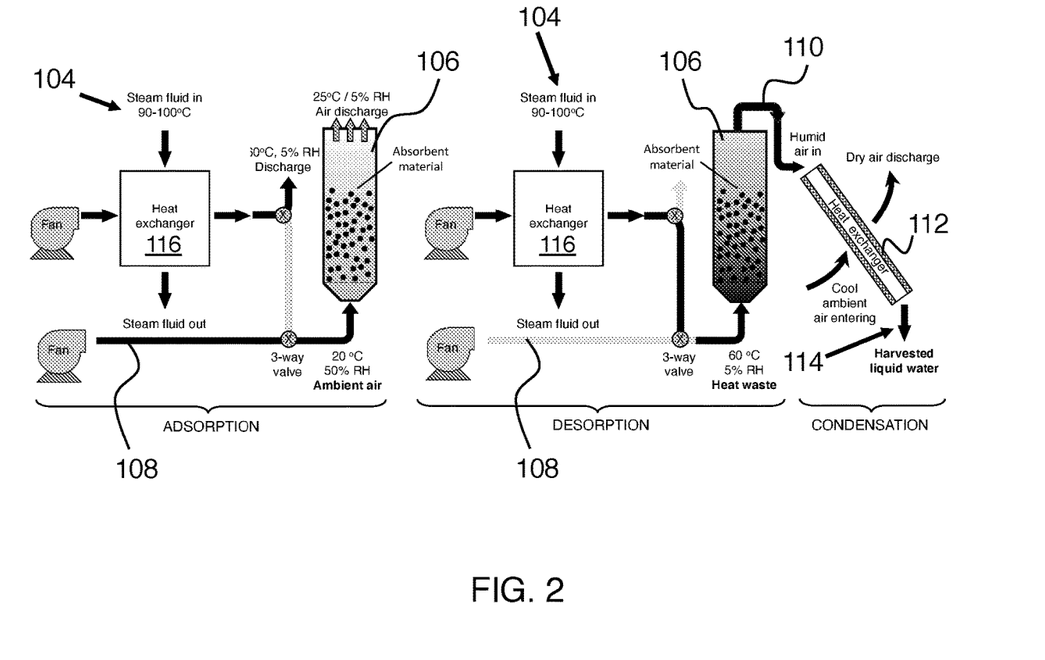
FIG. 2 shows an example of the embodiment of FIG. 1B

The example of FIG. 1B is similar to the example of FIG. 1A, except that waste heat gas output 104 enters a heat exchanger 116 and heat exchanger 116 provides heated gas 118 to adsorption/desorption device 106 during the desorption mode. Thus the input to adsorption/desorption device 106 during the desorption mode is either i) a gas stream heated by the waste heat gas output (FIG. 1B) or ii) the waste heat gas output (FIG. 1A). FIG. 2 shows a somewhat more detailed example of the concept of FIG. 1B. Here gas lines that are open and closed in the two modes are shown in black and gray, respectively.

Thus an exemplary embodiment of the invention is a method of harvesting water in a power plant where the method includes:

1) providing a heat engine that has a waste heat gas output;
2) providing an adsorption/desorption device having an input and having a gas flow through it, where the adsorption/desorption device has an adsorption mode where it removes water vapor from the gas flow by adsorption, and where the adsorption/desorption device has a desorption mode where it adds water vapor to the gas flow by desorption;
3) cycling the absorption/desorption device between the adsorption mode and the desorption mode at a cycle frequency f. Here the input to the adsorption/desorption device during the adsorption mode is ambient air and the input to the adsorption/desorption device during the desorption mode is either i) a gas stream heated by the waste heat gas output or ii) the waste heat gas output; and
4) providing a heat exchanger configured to receive an output gas flow from the adsorption/desorption device during the desorption mode, and configured to condense and recover liquid water from the output gas flow Preferably the adsorption/desorption device includes a fluidized bed of an adsorbent powder. The adsorbent powder can be a metal-organic-framework (MOF) material. The cycle frequency f is preferably 10 times per day or more.

A2) Rapid Adsorption/Desorption in a Fluidized MOF Bed

A2a) Summary

A method for efficient and scalable applications of absorbents in powder or small granular form factors is provided. Development of applications and scalability systems leveraging absorbent materials has been hindered as many absorbents are fabricated in the form of powders or small grains. Sintering and/or packing of such powders inhibits mass and heat transport and results in porous solid form factors with poor mechanical properties. Here, a method is provided to both overcome this need for porous solid form factors and to implement a form factor which can be readily applied to powder absorbents. The preferred embodiment of this idea is metal-organic-frameworks (MOFs) materials. The vast majority of MOFs materials are fabricated in a powder form. Here, a fluidized-bed arrangement is used to achieve rapid adsorption/desorption dynamics, and consequently, fast response cyclic operation for direct air capturing technologies (DAC). One example application is the capture of $CO_2$ from post-combustion air streams. A second example is atmospheric water (vapor) harvesting.

MOFs are a class of well-defined crystalline compounds that consist of metal ions or clusters that are bonded to organic ligands in order to form one-, two- or three-dimensional coordinated structures. These structures form a network that contains potential voids, and hence, are porous materials on the molecular scale wherein specific gas species can be adsorbed and/or stored.

Currently, powders such as MOFs are integrated into porous solids as a method of integrating into adsorption systems or scaling. These porous solid form factors are typically achieved with the use of additional materials which act as binders or by trapping or confining the powder using supporting mechanical structures (and packing). These form factors reduce the adsorption dynamics and capacity of the porous solid structures. The transfer of species into and out of the absorbents in such porous solids are hindered by slow transport through the interstitial spaces between grains or the diffusion into and out of larger grains and or grain agglomerates. In many cases, there is no appreciable advection of mixture through interstitial spaces and so the transport is limited by the molecular diffusion of gas/vapor molecules. The use of thin porous film absorbent layers at the micro/meso-scale may enable fast gas/vapor transport, and hence, saturation through the packed samples. However, such thin layers make difficult the scalability of the setup with the current state-of-the-art technologies being far from approaching practical energy engineering applications. For example, current packed MOF materials tend to be brittle and can deteriorate.

In section B below, we experimentally demonstrate in a unique prototype test facility that all aforementioned limitations are addressed by using the absorbent powder in its powder form as solid particles at least partially suspended within a gas-solid fluidized-bed system. A fluidized-bed is a system wherein a continuous fluid phase (typically gas) is flowed through a vessel containing solid particulates. The interaction of the continuous fluid phase with the particulates causes the particulates to trade momentum with the continuous fluid phase and to move. The entire fluid/solid mixture is termed to be "fluidized" and as some properties of a fluid (e.g. continuously deforming under shear stress). In the most common configuration, the fluidized bed is composed of solid particulates suspended by a flow of gas (often air). Also common is a vertical arrangement wherein the continuous phase is introduced from below and its motion causes at least some of the solid particles to be suspended vertically as they experience fluid drag force from the motion of the continuous phase.

The main practical advantages of this new "fluidized powder" mass exchange device include the following:
(1) The use of a fluidized bed enables ease of fabrication of adsorption cells using materials in a "native" powder form. This is particularly important for MOF materials which to date are typically fabricated in powder form.
(2) The fluidized bed arrangement enables extremely high contact surface between a continuous fluid phase and the powder absorbent grains. It also enables very small distances over which mass and heat need to diffuse. Both of these strongly drive mass transport and mass exchange between the continuous fluid phase and the powder grains. This rapid transport implies very fast diffusion of species into and out of powders such as MOF materials.
(3) The rapid transport and exchange between the continuous phase and the powder material enables relatively high frequency of adsorption/desorption cycles. This cyclic operation with relative high frequency enables economically efficient use of the powder absorbent material. For example, a MOF fluidized-bed which can be "cycled" through adsorption and desorption 50 times per day can achieve much higher throughput than a MOF cell design which can only be cycled a few times per day.
(4) A key aspect of this design relies on cycling of the partial pressure of the species to be captured. For example, for $CO_2$ this cycling can be accomplished by cycling between a $CO_2$ rich stream (for adsorption) and a $CO_2$ lean stream (e.g. atmospheric air, for desorption). The inlet temperature of the stream can also be cycled to aid in absorption and desorption.

The net result is an easy-to-scale, economic and high-flow-capacity form factor for adsorption applications of powder absorbents. Note that the majority of the literature around adsorption applications using MOF materials teaches that the MOF powder should be fabricated into a porous or packed solid (e.g. a cake or frit created by binding). In a sense, the new approach presented here is to do the opposite and use a form factor wherein a powder with the smallest MOF grains is most advantageous for convenience, scalability, and rapid cyclic operation for economic use of the material (e.g. high values of adsorption capacity per weight of MOF powder).

Variations of the above described principles include:
a) Adsorption-desorption cycling provided by actuating upstream valves to draw the inlet fluid stream from two sources in an alternating fashion.
b) The continuous phase being air or any other gas.
c) Adsorption-desorption cycling provided by cycling of temperature and/or pressure.
d) An outlet of fluidized bed can be connected to valves such that during part of the operating cycle, the outlet goes to a condenser (to condense liquid water).
e) The target species can be $CO_2$ and the outlet during the desorption phase can flow to a storage or processing method for $CO_2$ (e.g. reformation of $CO_2$).
f) The continuous phase flow can be turbulent to aid with mixing of momentum and species and heat.
g) The system can be arranged such that the continuous phase flows in a direction opposite to gravity so that the motion of the continuous phase causes at least some of the particulates to move upward levitated by drag force from the moving stream.

A2b) Exemplary Embodiments

Accordingly, embodiment 1 of the invention is a method of rapid sorption cycling of a target gas species, the method comprising:
1) providing a fluidized bed including an adsorbent powder disposed in a gas flow to provide fluidization of the adsorbent powder, wherein the adsorbent powder includes a metal-organic-framework (MOF) material;
2) cycling the fluidized bed between an adsorption mode and a desorption mode at a cycle frequency f, wherein input gas is provided to the fluidized bed and wherein output gas is provided by the fluidized bed;
2a) wherein the adsorption mode has an output concentration of the target gas species in the output gas being less than an input concentration of the target gas species in the input gas because of adsorption of the target gas species on the absorbent powder;
2b) wherein the desorption mode has the output concentration of the target gas species in the output gas being greater than the input concentration of the target gas species in the input gas because of desorption of the target gas species from the adsorbent powder;
2c) wherein the cycle frequency f is chosen such that a gas productivity $f\omega_g^r$ is improved, wherein $\omega_g^r$ is a released gas mass from the fluidized bed per cycle;
2d) wherein the cycle frequency f is 10 times per day or more.

Embodiment 2 is the method of embodiment 1 wherein the target gas species is selected from the group consisting of: water, carbon dioxide, carbon monoxide, oxides of nitrogen, and combustion products of hydrocarbons.

Embodiment 3 is the method of embodiment 1 further comprising cycling an input partial pressure of the target gas species at the cycle frequency f.

Embodiment 4 is the method of embodiment 3, wherein the input partial pressure of the target gas species is higher in the adsorption mode than in the desorption mode.

Embodiment 5 is a method of rapid sorption cycling of two or more target gas species, the method comprising: performing the method of embodiment 1 for each of the two or more target gas species in parallel in a single system.

Embodiment 6 is a method of rapid sorption cycling of two or more target gas species, the method comprising: performing the method of embodiment 1 for each of the two or more target gas species in parallel.

Embodiment 7 is a method of rapid sorption cycling of two or more target gas species, the method comprising:

performing the method of embodiment 1 for each of the two or more target gas species in parallel with a common energy source.

Regarding point 2c above, note that gas productivity is a product of cycle frequency and released gas mass (from fluidized bed) per cycle. This choice of cycle frequency can imply an operation where the adsorbed mass per cycle is decreased to increase $f\omega_g^r$. Increase of $f\omega_g^r$ can be used to increase overall productivity of the system for a given mass of absorbent. These considerations are essential to balancing production versus initial capital investment of the system.

B) Rapid Adsorption-Desorption in a Fluidized MOF Bed—Experimental Demonstration B1) Introduction Atmospheric water harvesting (AWH) is an important alternative water resource due to the abundance of water vapor in the atmosphere, which constitutes a resource equivalent to about 15% of global freshwater in rivers and lakes. Among different AWH methods, sorption-based techniques are well known and recently gathered scientific attention with the development of metal-organic frameworks (MOFs). MOFs are a new class of well-defined crystalline materials that include metal ions or clusters bonded to organic ligands in order to form multi-dimensional coordinated structures on the molecular scale. Depending upon the MOF material nature, the voids of these porous networks can be chemically tuned to act as depositories wherein large amounts of specific gas species, e.g. water for AWH, can be adsorbed, stored and released for further use.

The design point of an atmospheric water harvester depends on sorbent's adsorption isotherm, and for MOFs, a proper selection from a huge database will yield the water harvesting potential based on ambient temperature and relative humidity (RH). A recent proof-of-concept device demonstrated the possibility to harvest moisture and produce liquid water at 20% RH with a Zirconium-based metal-organic framework, MOF-801. MOF-801, shaped in a thin packed bed geometry, was exposed to ambient to adsorb moisture during night-time and then solar heated during daylight to release the captured water within a fixed-volume box. The increased water vapor capacity in the device drove dew condensation and droplet formation. Similar devices were tested in the Arizona desert (US), and showed a water production of 0.25 L and 0.1 L per kilogram of MOF-801 per day with assistance of an external condenser or by using only natural cooling. At the same time, significant effort was made to develop materials with exceptional water uptake capacities.

The current high cost of MOF type adsorbents, however, strongly implies that water capture methods should be designed to maximize the system water productivity normalized by the MOF mass. We here advocate that this necessarily implies a multi-cycle operation of MOF adsorbent per day. As previously reported, continuous cyclic operation of a 1 mm thick MOF-801 with a packing porosity of 0.7 could typically allow 8 cycles per day which can yield 0.9 L/m² or 2.8 L/kg$_{MOF}$ daily at 20% RH. Higher frequency operations can be achieved only with more rapid sorption dynamics. One important advancement in the area is therefore the development of an Aluminum-based metal-organic framework, MOF-303, which has been shown in small-scale laboratory experiments to perform adsorption and desorption phases within minutes. In the latter work, continuous cyclic operation of several MOF-303 layers of 3 mm thickness and 0.7 packing porosity provided an average of 8.3 (unsaturated) cycles per day over a 72-hour period. The device was powered by electrical heater strips, and additional fans were used to drive an airstream through the adsorbent cell and then to an external condenser—generating 1.3 L/kg$_{MOF}$ daily at laboratory conditions (32% RH, 27° C.) and 0.7 L/kg$_{MOF}$ per day in the Mojave Desert (10% RH, 27° C.). We attribute the current limitations on operation frequency to the very large diffusion time scales of the packed bed sorbent geometries which result in multi-hour adsorption and desorption times, and often partially saturated adsorbents even if the packed-bed of MOFs is adjacent to a forced convective flow.

Much of the work around implementation and scaling up of MOF material applications has been on formation of porous-solid form factors which are then integrated into mass exchange units. These porous solid form factors are typically achieved with the use of additional materials which act as binders or by packing or mechanically confining the powder using supporting mesh structures. These form factors may be convenient for assembly and analysis, but drastically reduce adsorption rate and can lower capacity of the porous solid structures—both negatively affecting mass and heat transport. Further, the sorption dynamics of MOFs is very sensitive to pressure-shaping processes. The transfer of species into and out of the adsorbents in such porous solids is hindered by slow transport through the interstitial spaces between grains or the diffusion into and out of larger grains and or grain agglomerates. In many cases, there is no appreciable advection of mixture through interstitial spaces and the transport can be additionally limited by molecular diffusion.

To date, the specific productivity of sorption-based atmospheric water harvesters operated by MOFs has been limited to order 0.1-1.3 L per kilogram of MOF per day. We attribute this severe limitation to the single daily cycle operation and/or the low characteristic operating frequencies that have been used given the current MOF form factors. We here consider a fluidized bed as a form factor, which is a scalable technology widely used in industrial applications, such as the petrochemical industry and for biomass gasification. Fluidization has been proposed as a method to activate and shape MOF materials for $CO_2$ capturing applications. However, fluidized MOF systems have not been used for adsorption/desorption cycling, and we are aware of no work reporting experimental measurements of sorption dynamics of any kind in a MOF fluidized bed. Water vapor adsorption and desorption has also been shown in fluidized beds of silica gel materials with applications to air-conditioning systems. However, the latter studies have not demonstrated cycling of sorption and have not demonstrated dynamic steady state operation of the sorption process. With fluidization of MOFs, we dramatically increase the productivity of the sorption component of a water vapor capture system by achieving exceptionally high rates of mass transfer and operational frequencies. As we discuss in the next section, this is achieved by increasing the surface area of adsorbent exposed to an airstream while simultaneously decreasing characteristic length scales over which diffusion must act for mass exchange. In particular, we experimentally demonstrate a fast response operation of fluidized-MOF-801 at more than 75% of its uptake capacity, capable to yield water vapor harvesting rates an order of magnitude higher than any existing technology. This is possible by the achievement of 40 and 55 adsorption/desorption cycles per day at only 18% and 39% RH, respectively.

B2) Results
B2a) Fluidized-MOF Powder Enables High Frequency Adsorption/Desorption Cycling A fluidized bed is a system wherein a continuous fluid phase (typically gas) is flowed through a vertical vessel containing solid particulates. The interaction of the continuous fluid phase with the particulates causes the particulates to trade momentum with the continuous fluid phase, causing the system to move and mix. The entire fluid/solid mixture is termed to be "fluidized" when the drag and buoyancy forces balance gravity, and the total system adopts some properties of a fluid (e.g. continuously deforming under shear stress).

Figure 3:
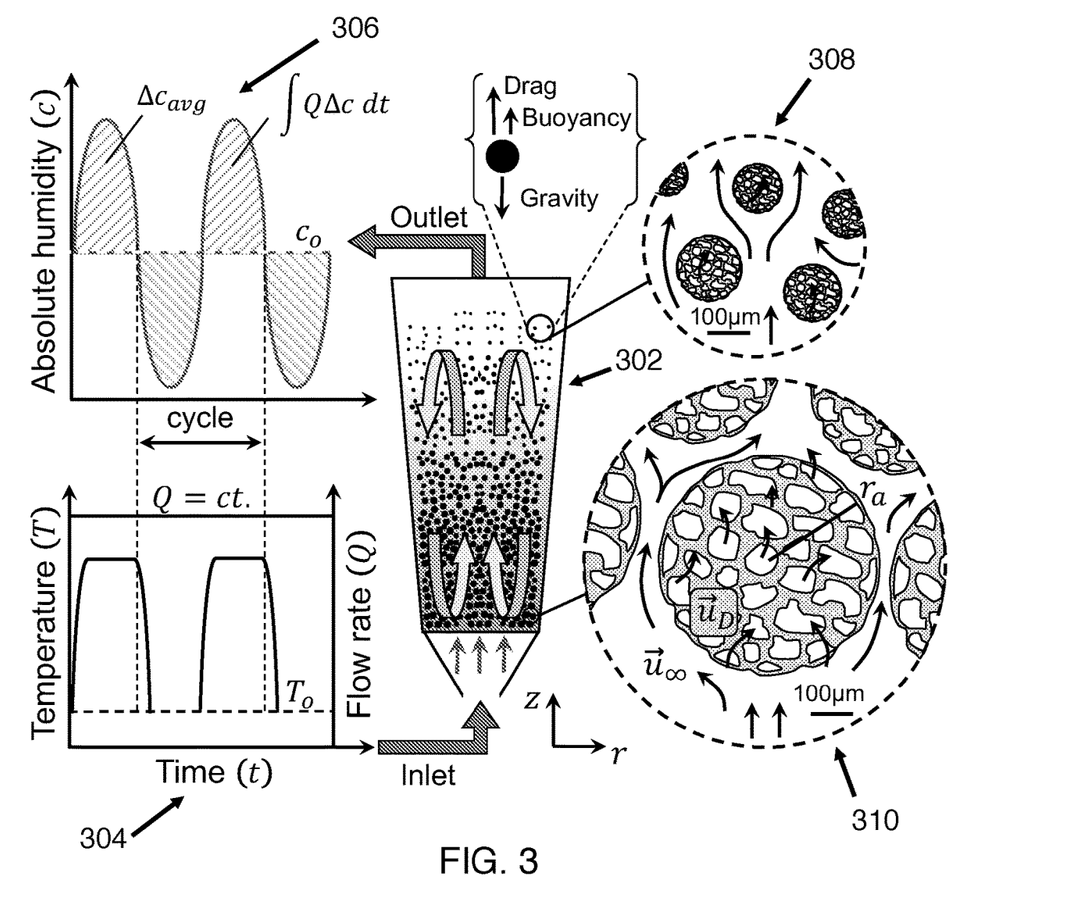
FIG. 3 is a schematic of a fluidized bed design for the sorption component of an atmospheric water harvesting system in accordance with a second aspect of the invention.

A schematic representation of a fluidized adsorbent cell for AWH applications is shown in FIG. 3. At the inlet of the fluidized bed 302, the airstream temperature is periodically varied between cold (ambient) and hot conditions to drive, respectively, moisture adsorption and desorption into and out of the adsorbent. This is shown schematically by plot 304. Subsequently, continuous cycled water vapor harvesting can be obtained at the exit of the fluidized bed during the sorbent's regeneration process. This is shown schematically by plot 306. The requirement for heating is compatible with low-grade waste heat and the system has potential for 24-hour operation.

The solid particulates are adsorbents in fine powder or their granular agglomerates, in this work metal-organic frameworks (MOFs). The largest particles are spherical porous agglomerates of a few hundred microns diameters, e.g., as shown in enlarged views 308 and 310 on FIG. 3. The very high surface-to-volume ratio enables rapid diffusion dynamics, and hence, high frequency operation of the adsorbent cell.

In their native powder form, fine adsorbent powders such as metal-organic frameworks (MOFs) are characterized as "cohesive particles" based on Geldart fluidization diagram. Due to their small single crystal length scales, typically varied from a fraction to a few microns, interparticle forces caused by van der Waals forces and electrostatic attractions collect individual particles together to form agglomerates. Therefore, we observe MOF powders are not fluidized as individual particles but largely as porous agglomerates with various size distribution (see FIGS. 5A-C). The fluidization can be homogenized along the height of the bed chamber using a slightly divergent, diffuser-style vessel geometry, wherein larger (heavier) agglomerates are fluidized closer to the bottom of bed. Other methods have been used to assist fluidization of cohesive particles include sound excitation, vibration, stirrers, flow pulsation, and mixed-particles.

We observe agglomerating fluidization results in approximately spherical agglomerates with diameters varying from microscopic to millimeter scale, which are consistent with the observations of a wide range of other powders. Consequently, we hypothesize that during fluidization, a portion of airstream flows through the porous agglomerates, as in the classic case of a porous sphere in a flow. For a given flow rate, the water vapor transported in and out of any form of porous adsorbent agglomerates, a, can be described by a convection-diffusion equation of the following form:

$$\frac{\partial c_w}{\partial t} = \nabla \cdot (D_v \nabla c_w) - \nabla \cdot (\vec{u}_D c_w) + \frac{1-\varepsilon_a}{\varepsilon_a} R_s \tag{1}$$

where $c_w$ is the water vapor concentration, $D_v$ is the intercrystalline mass diffusivity of agglomerates, $\vec{u}_D$ is the superficial velocity through the voids of agglomerate (Darcy velocity), and $R_s$ is the instantaneous rate of adsorption (or desorption) described by a linear driving force (LDF) model:

$$R_s = \frac{15}{r_c^2} D_c (c_{w,eq} - \langle c_{w,c} \rangle). \tag{2}$$

Here, $D_c$ and $r_c$ are the mass diffusivity and radius of a single MOF crystal in the aggregate (smallest characteristic length scale), $c_{w,eq}$ is the equilibrium concentration obtained from adsorption isotherms, and $\langle c_{w,c} \rangle$ is the instantaneous water vapor concentration inside agglomerate's single crystals. We here consider a simple analysis of the transport in this problem based on the latter two equations. For rapid mass transport, there are at least three characteristic time scales which should be kept small to achieve fast response operation of a fluidized adsorbent cell. These include: 1. advective transport along the fluidized bed expansion length, H, 2. diffusion over individual adsorbent crystals and, 3. transport (diffusive and advective) within the fluidized porous agglomerates. These characteristic times respectively scale as follows: $H/u_\infty$, $r_c^2/D_c$, and $\min(r_a^2/D_v, r_a/u_D)$. For the latter, we heuristically consider the minimum time scale of two competing transport modes within agglomerates of variable radius, $r_a$. These are discussed further below.

First, the velocities required for fluidization in Earth's gravity are sufficiently high that the transport time scale $H/u_\infty$ is negligibly small. In our setup, this time is about 0.05 s. The second time scale $r_c^2/D_c$ can be interpreted as the diffusive transport time required to drive water into and out the characteristic radius $r_c$ of the smallest adsorbent crystal material and is determined by the nature of the adsorbent material itself. This time scale is not influenced by fluidization and, provided that the non-porous grains (or individual crystals) are sufficiently small, represents the optimum theoretical limit to maximizing system's productivity. In such a case, the water vapor adsorption and desorption are diffusion limited as per Eq. 2. The transport in a fluidized bed is hence most likely limited by the third mode of transport: The coupled advective-diffusion time scale for transport into and out of the largest porous agglomerates, characterized by $\min(r_a^2/D_v, r_a/u_D)$. The latter transport is greatly influenced by both the fluidization air velocity field and the characteristic size of agglomerates formed during the adsorption/desorption phases. For example, we observe small qualitative variations in the diameter of these grains during the cycle (cf. FIGS. 5A-C). Despite such formations, and as we will demonstrate quantitatively below, we observe that fluidization results in much improved transport rates relative to typical packed bed type MOF form factors. We attribute this to two reasons. Firstly, the radii of these porous agglomerates are observably a few hundred microns (see FIG. 5C), which is significantly smaller than the millimeter order size of packed bed MOF layers reported in literature. Secondly, the porous agglomerates in our fluidized bed are exposed to a high momentum airstream impinging directly onto the agitated agglomerates. We hypothesize that this results in a significant advective flux term $\nabla \cdot (\vec{u}_D c_w)$ within the air-filled pores of agglomerates. The ratio of advective-to-diffusive transport fluxes within the porous agglomerates can be characterized by scaling the ratio of the first and second terms on the right-hand-side of Eq. 1 to yield a Péclet number of the form $r_a u_D / D_v$. Our observations of porous agglomerate size and porosity (see below) and the rapid adsorption/desorption response of our system suggest that this Péclet number is greater than unity.

Lastly, we briefly comment on limitations related to heat transport. In the current design, we drive cycles by varying the input temperature, with a rectangular wave as the approximate model waveform. The time required for heat transfer may also limit ultimate performance. We hypothesize that the rate of heat transport within the air and MOF material within the fluidized agglomerate bodies is at least comparable to that of mass transport. For example, note that the characteristic Lewis number within the heterogeneous network of intercrystalline voids spaces of agglomerates is significantly higher than unity. Hence, we estimate that a thermal Péclet number of the form $r_a u_D / a_v$ is also greater than unity. This is consistent with our earlier hypotheses of mass transfer and suggests a significant contribution of the advective flux term on the heat transfer process. This suggests that the thermal response time scale of our current system is limited by the temperature cycling of the test structure itself (via forced thermal convection). The thermal mass of the solid structure includes the diffuser-shaped bed chamber, the flow fittings, and the inlet tubing of the device. We estimate this thermal mass to be on the order of 1 kJ/K.

B2b) Hydraulic Power is Negligible Compared to Heating Power

Figure 4:
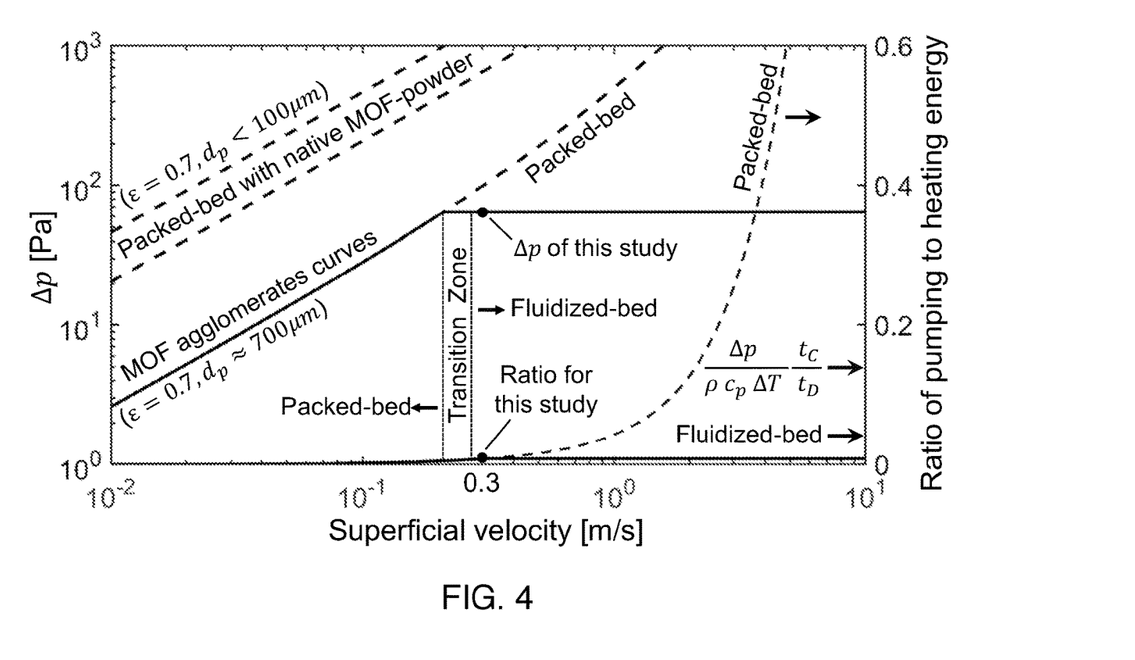
FIG. 4 is a comparison of pumping and heating energy requirements for a fluidized MOF bed.

The energy input into sorption-based systems of the type discussed here are heating of air, which is necessary for regeneration, and the energy required to pump air through the system. Ignoring any losses in supply lines, these are respectively $\dot{m}c_p \Delta T$ and $Q \Delta p$, where $\dot{m}c_p$ is the thermal mass of the airstream, $\Delta T$ the temperature rise, Q the volumetric flow rate, and $\Delta p$ the pressure drop across the adsorbent bed. In FIG. 4, we used Ergun's correlation to predict $\Delta p$ for MOF-801 packed bed columns of the length of our fluidized bed (L~15 mm), and we plot the pressure loss versus the superficial air velocity through the bed. Here we account for the thermophysical properties of MOF-801, and assume a particle sphericity of 0.95 and a bed porosity of 0.7. As a relevant comparison, we show pressure drop curves for a packed bed configuration of the native powder form and for the MOF agglomerates generated after running a fluidized bed. As for the latter, the transition zone for the MOF agglomerates was estimated experimentally by gradually increasing the flow rate until complete fluidization at about 0.3 m/s. Above this transition zone, $\Delta p$ remains approximately constant and further increase of superficial velocity results in fluidized bed expansion, eventually resulting in the so-called pneumatic transport regime (not shown here). In contrast to this fluidized bed situation, packing of the MOFs in their native powder form typically produces porous solid form factors with particle diameters below 100 microns. For such packed beds, we estimate a permeability of 2.3E-10 $m^2$ and this results in significant pressure drop for a given superficial velocity, as shown in the left axis of FIG. 4.

Together with pressure drop information, the right ordinate of the plot shows the ratio of pumping-to-heating energy requirements, considering that desorption phase is 25% of the cycle duration. Here we consider a temperature rise of 40° C. compared to ambient conditions. For superficial velocities below 1 m/s, the pumping energy is only a small fraction of the heating requirements and about 1% in case of a fluidized bed. Consequently, we chose to fluidize just above the minimum fluidization velocity to achieve high mass and heat transport rates, and hence high frequency operation, while maintaining a negligible (compared to heating) air pumping power.

Figure 5A:
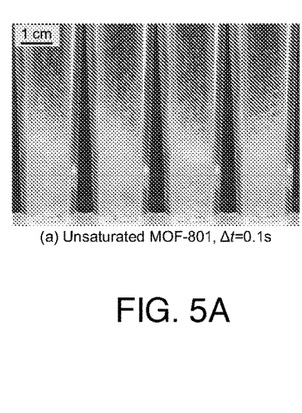
FIGS. 5A-C are an illustration of MOF-801 fluidization and agglomerate characterization.
Figure 5B:
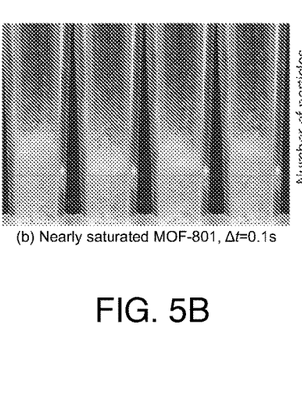

B2c) Observed Fluidization Dynamics and Quantification of Agglomerate Distribution FIGS. 5A and 5B show representative images during the adsorption process of MOF-801. At the top of fluidized bed, the splashing zone is characterized by smooth fluidization wherein very small grains are ejected upwards creating a fountain of flowing particles, schematically indicated in FIG. 3. Images shown are taken at time intervals of 0.1 s and exemplify fast particle motion and vigorous stirring within the fluidized bed. In the splashing zone, small grains are ejected upwards at distances up to three times the fluidized-bed height, while larger agglomerates are fluidized closer to the bottom of the bed. Fluidization velocities are lower near the walls of the vessel, thus particles fall visibly and convect downward near the walls. These mix with the bottom portion of the bed surface and the process is repeated. Note that the main core of the bed exhibits a bubbling fluidization behavior which is a necessary condition for appropriate mixing dynamics. The images also show individual spherical agglomerates with radii ranging from a maximum of about 0.5 mm down to order micron sizes. Analysis of correlated image sequences also show particles distributed throughout the length of the bed, with largest particles in locations nearest the inlet (bottom) of the bed.

Preliminary experiments (not shown here) with bed chamber of approximately same length but with constant diameter exhibited a very bimodal adsorbent location distribution—with many small particles "packed" into the top filter and many larger particles near the inlet (and many of these hardly fluidized). We attribute the broad placement distribution and strong agitation of the current system to the divergent, diffuser-like shape of the bed chamber, which has been shown to favor such fluidization dynamics. We also noticed that the agglomerates are smallest and more actively fluidized (e.g. to higher heights) near the beginning of adsorption process. Near the end of adsorption, by contrast, there is a noticeable shift of particles toward the bottom of the bed. The latter is consistent with both larger agglomerates and higher density material associated with water adsorption.

Figure 5C:
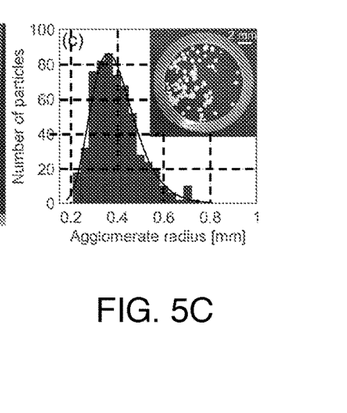

We performed some simple image analyses of the MOF-801 material after several fluidization cycles. To this end, we extracted a collection of particles biased in favor of the largest particles (by gently pouring out part of the material onto small collection plate). We were particularly interested in these largest agglomerates as they likely limit the maximum rate of air-to-particle-center transport of water vapor. We collected approximately 600 of these larger spherical particles and obtained six images like the example shown in the inset of FIG. 5C. We developed a custom image analysis tool in MATLAB (using standard thresholding and morphological image processing) and used this to quantify the radius of these large agglomerates. FIG. 5C shows that the radius of these largest collected agglomerates varied between 200 and 550 µm with a mean radius of 395 µm in a log-normal distribution.

This diffusion length scale is an order of magnitude smaller than the characteristic thicknesses of 2.57 mm, 2.54 mm and 3 mm for packed bed MOF layers used in prior studies. After quantifying their size distribution, we weighed these largest grains in a mass balance and combined this with the size distribution to estimate an average porosity of about 0.72. Surprisingly, this value is very close to the reported optimum porosity 0.7 for maximum yield of atmospheric water harvesting cycle materials. The aforementioned data support the hypotheses and scaling arguments presented earlier and described schematically in FIG. 3. The porosity, degree of agitation (and levitation) of such particles, and the fast response of the system (see below) also support the hypothesis that the advective flux term in Eq. 1 is important for the interparticle moisture transport.

B2d) Measurements Showing High-Frequency Water Vapor Harvesting

High-frequency adsorption/desorption operation of the fluidized MOF-801 material was obtained at 18% and 39% RH, for at least 10 consecutive cycles. The first cycle shows different behavior due to initial transients in both temperature and MOF water content, and to slight adjustments of flow conditions which occur only during that first cycle. The system thereafter quickly reaches a dynamic steady state. The criterion to end each adsorption and begin desorption phase (and vice versa) was chosen as the instance when the inlet-to-outlet absolute humidity difference was less than 5%.

Figure 6A:
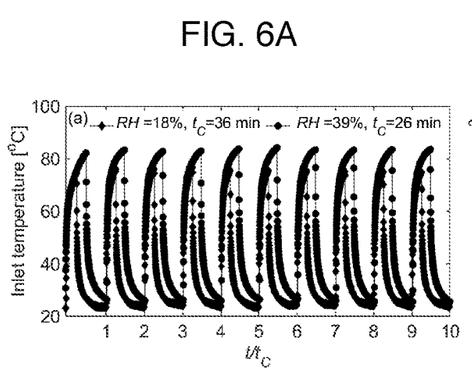
FIGS. 6A-D show dynamic steady state and continuous cyclic sorption dynamics.
Figure 6B:
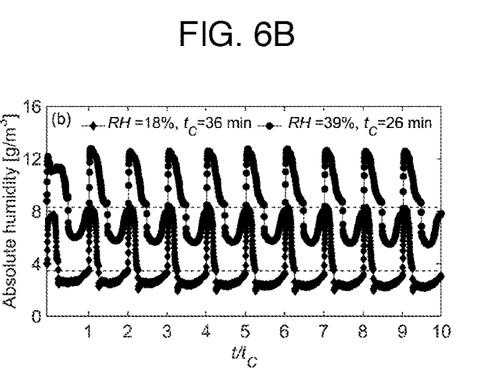

FIG. 6A shows the variation of inlet temperature which, for both experiments, have shape characteristics consistent with first order thermal response of the system (upon forcing with the rectangular wave input associated with the inlet valve operation). During desorption, temperature first increases rapidly and the slope begins to decrease, reaching about 75° C. and more than 80° C. at the end of the phase for RH values of 18% and 39%, respectively. For the adsorption phase, temperature falls rapidly and then begins to level off, reaching the inlet ambient conditions. These temperature differences are sufficient to drive adsorption and desorption as per well characterized adsorption isotherms of MOF-801 (see FIG. 7C). The outcome of this cyclic temperature variation is directly reflected on the water vapor content at the exit of the fluidized bed, shown in FIG. 6B. For the desorption phase at 18% and 39% RH, the outlet absolute humidity increases rapidly to maximum values of about 8 and 13 g/m$^3$, respectively, as water is released from the bed. For adsorption phase, the outlet absolute humidity decreases, achieves a minimum and then begins to increase gradually toward the inlet conditions and as the MOF-801 becomes saturated. Note the complex shapes of the humidity cycle curves and the qualitative difference in shape between the two RH values. We hypothesize these shapes are influenced by RH levels and the gradient of the sigmoidal adsorption isotherms (cf. FIG. 7C), the aforementioned dynamic changes in size distribution of aggregates, the unsteady heat transfer in the system, and the complex fluid flow within fluidized bed (among other factors).

Figure 6C:
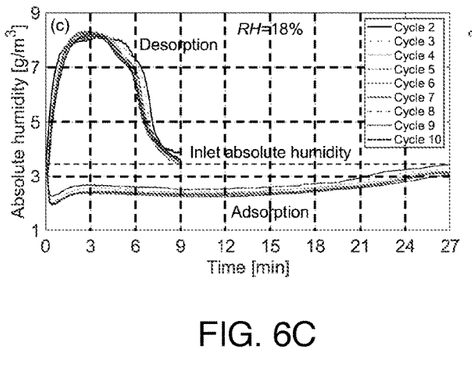
Figure 6D:
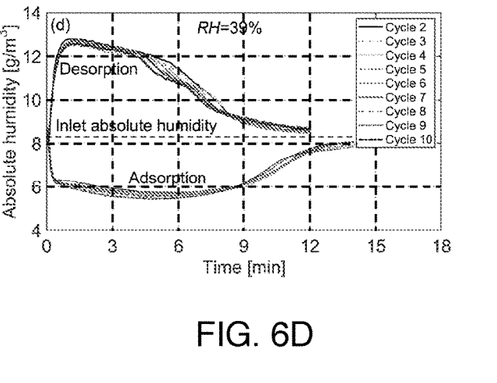

FIGS. 6C-D summarize the cycle-to-cycle repeatability of the complex shape of the humidity curves for our experiment. Plotted are direct overlays of cycles 2 through 10. We see excellent quantitative agreement in shape and magnitude of consecutive cycles. We attribute this to the reproducible dynamics of fluidization, including bubbling dynamics of the lower bed contents. This repeatability is also strong evidence of negligible degradation of sorbent capacity—at least for the operating times considered here (more than order 100 h of operation). Here, the water vapor content is plotted as a function of time to demonstrate the fast response operation of the fluidized adsorbent cell. At 18% RH, desorption and adsorption phases last 9 and 27 min, respectively (see FIG. 6C). A complete cycle duration is thus only 36 min, which in turn results in 40 cycles per day. Similarly, at 39% RH, desorption and adsorption are completed within 12 and 14 min, accordingly (see FIG. 6D). This constitutes an adsorption/desorption cycle in 26 min and thus potential for more than 55 cycles per day. The water uptake process is, as expected, slower for 18% RH (27 min) compared to 39% RH (14 min). As we discuss below (see Eq. 4), the important figure of merit for productivity capacity is the product of per-cycle mass capacity of the adsorbent and the number of cycles per day.

The demonstrated high frequency operation associated with MOF-801 fluidization can be further appreciated by comparing these results to published data using a 3 mm thick packed-bed geometry of MOF-303 and a parallel convective flow normal to this thickness. The latter system was operated for 450 min at 22% RH and this duration of adsorption was insufficient to saturate the material. At 39% RH, the system was reportedly saturated after about 300 min adsorption phase. By comparison, the current fluidization of MOF-801 results in an adsorption phase with a time scale that is 20 to 25 times faster for similar RH values. These data demonstrate the possibility to achieve exceptionally high operating frequencies using MOFs in their native particulate form within a fluidized bed.

The performance of a sorption-based atmospheric water harvester greatly depends on the total mass of water captured and released normalized by the sorbent mass. For given volumetric flow rate, Q, the water mass captured ($\omega_w^c$) and mass released ($\omega_w^r$) can be estimated as follows:

$$\omega_w^{c,r} = \frac{Q}{m_{MOF}} M \int \Delta c \, dt. \tag{3}$$

Here, $\Delta c$ is the instaneous difference of water vapor molar density between inlet and outlet conditions, $\Delta t$ is the time duration of adsorption or desorption, M is the molecular weight of water, and $m_{MOF}$ the mass of MOF-801.

Figure 7A:
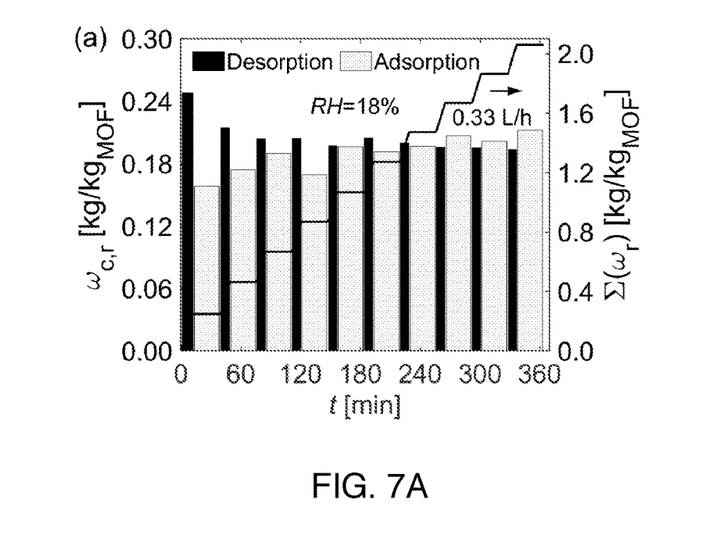
FIGS. 7A-B show water vapor captured and released per cycle during fluidization of MOF-801.
Figure 7B:
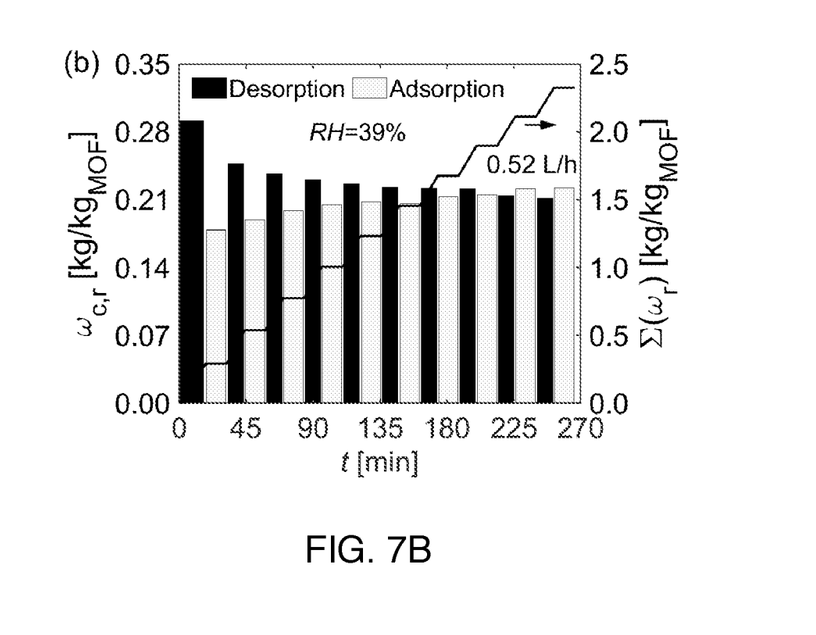
Figure 7C:
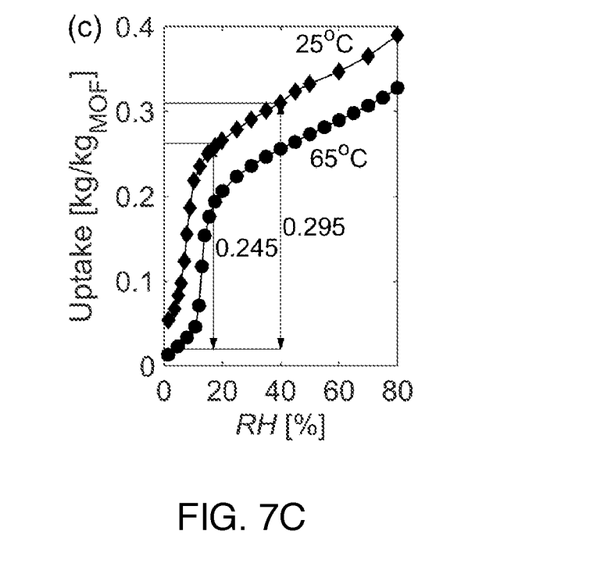
FIG. 7C shows adsorption uptake of MOF-801 vs. relative humidity at two different temperatures.

FIGS. 7A-C show that the amount of captured and released water vapor per cycle is constant as the system adopts dynamic steady state conditions. The second ordinates on the right (and the black curve) are based on integrations of the measured humidity during desorption and indicate cumulative water removed. An average of 0.198 and 0.223 kilograms of water vapor per kilogram of MOF-801 can be harvested per cycle, at 18% and 39% RH, respectively. These measured values are very close to the respective measured maximum overall uptake capacity of MOF-801 which is about 0.26 (18% RH) and 0.31 (18% RH) kg/kg$_{MOF}$ (cf. FIG. 7C). Note also that the desorption explored here was performed using relatively moderate temperature differences. These temperatures imply that MOF-801 cannot be regenerated completely resulting in retained water vapor of about 0.015 kg/kg$_{MOF}$. Hence, the current working capacities of 0.245 and 0.295 kg/kg$_{MOF}$, as indicated in FIG. 7C, are about 80% and 76% of the available uptake capacity at 18% and 39% RH. Importantly, we can also define a system water vapor productivity P as the mass of moisture recovered per time and per mass of adsorbent (L/kg$_{MOF}$/day) for many cycles as follows:

$$P = f \omega_w^r \kappa. \tag{4}$$

Here, f is the frequency of the cyclic operation (cycles-day$^{-1}$) and $\kappa$ is the fraction of time during the day when the system is operated. For $\kappa$ values of approximately unity, the water vapor harvesting rates of our system are estimated as 0.33 L/h and 0.52 L/h per kilogram of MOF-801 for RH values of 18% and 39%, respectively (see FIGS. 7A-C). We attribute such high values of water vapor productivity to the rapid cyclic periods of 36 min (18% RH) and 26 min (39% RH) obtained with fluidization.

B3) Discussion

Various figures of merit have been used and proposed to quantify the performance of AWH technologies. Perhaps the most important of these is the amount of water produced normalized by the mass of adsorbent material. For this figure of merit, high frequency sorption dynamics is essential and the MOF material form factor should be optimized not only for small characteristic length scales appropriate for rapid mass and heat transport (e.g. porosity, MOF weight per area etc.), but also for leveraging the advection in mass transport, as per the advective flux term of Eq. 1. Here, we experimentally demonstrated that fluidization of MOFs is very promising for achieving exceptionally high operational frequencies leveraging 80% of sorbent's uptake capacity. A second figure of merit is the power cost per unit volume of produced water. A preliminary energy assessment of our fluidized adsorbent cell suggests that the energy required to pump the air through the bed is below 1% of the heating requirements for regeneration (even at moderate regeneration temperatures) and significantly smaller than the hydraulic power required for packed beds of the native MOF powder. This leads us to consider designs that use low-grade waste-heat for regeneration to maximize overall efficiency, e.g. power plant exhaust streams with temperatures of order 100-120° C. A second possibility is solar thermal heating of air. Note that such uses of waste heat are not easily leveraged for refrigeration-based AWH systems. For refrigeration, input power is typically dominated by electric power applied to a compressor. Furthermore, we hypothesize that dew condensation at energetically favorable temperatures (and perhaps even ambient temperature) may be achievable by lowering the air flow rate during the desorption phase.

We note that a third figure of merit which may influence design of distributed systems, infrastructure cost, and portability (e.g. in a truck bed) may be the water volume produced per time and per volume of the system (with units of inverse time). For the current system, assuming 70% is recoverable in a condenser, we estimate a values of 0.4 s$^{-1}$ (18% RH) and 0.63 s$^{-1}$ (39% RH) for our system. Note that we do not include here a figure of merit based on amount of water yielded versus amount input into the system (e.g. as in a recovery ratio % yield of input water) for two reasons. First, unlike desalination or contamination removal technologies, the current system has no cost associated with "disposal" of processed air. Second, pumping excess air into the system is only important if hydraulic power contributes significantly to operating costs, which we believe is not important relative to other costs of a realistic water harvesting system such as initial cost of the plant and MOF material, and any operational costs of a downstream condenser.

In summary, we experimentally demonstrated the ability to perform 40 and 55 water vapor adsorption and desorption cycles per day at 18% and 39% RH by fluidizing MOF-801 in its native particulate form. The fluidized bed operation also resulted in leveraging of about 80% of the MOF-801 maximum uptake capacity with cyclic periods of 36 min (18% RH) and 26 min (RH 36%). The moisture harvesting rates of our system are estimated at 0.33 L/h (18% RH) and 0.52 L/h (39% RH) per kilogram of MOF-801, and this is at least an order of magnitude higher than existing methods incorporating packed bed MOF shape bodies. Therefore, this fluidized MOF adsorbent approach has the potential to significantly improve the sorption unit of an atmospheric water harvester with a scalable and high-flow-capacity form factor. Plausible extensions of the current work include the optimization of fluidization process for large scale energy engineering applications, including $CO_2$ capturing, as well as the development of heat and mass transport models to simulate the complex dynamics of fluidized atmospheric water harvesters under various meteorological conditions.

B4) Experimental Procedures

All water vapor sorption cycling experiments were conducted custom designed test facility. The system provides both temperature and humidity control for air flow to the fluidized be. The solid particulates in the fluidized bed include approximately 0.52 g of activated MOF-801 in its native particulate form. SEM images of the powdered MOF-801 revealed an average crystal diameter of 0.4 µm. The system is able to pre-treat and generate dry-air and water-vapor airflow mixtures with an accuracy of 1% in the range of 0-70% RH. The temperature of the air/vapor mixture can also be set independently of absolute humidity by diverting all or part of the airflow through a heat exchanger powered by an electric heater. The system can valve between cold (adsorption) and a hot (desorption) flow input streams using a three-way valve. The temporal dynamics of the relative humidity and temperature upstream and downstream of the fluidized bed are measured with two humidity-temperature sensors (Sensirion SEK-SHT35). During data acquisition, the absolute humidity and the dew point of the measurement locations are concurrently calculated with the Arden Buck equation for the water vapor saturation pressure.

We evaluated system performance at several inlet conditions and here chose the following two inlet boundary conditions: 18% RH at 22° C. and 39% RH at 23.5° C. The system first achieved appropriate inlet conditions, and then, the flow rate was gradually increased until complete fluidization with full bed expansion was obtained. For a bed height of about 15 mm, this resulted in a fluidization velocity of 0.3 m/s. Note that this value is very close to empirical correlations applicable for uniform particle sizes, e.g. Wen and Yu equation. If we consider as a characteristic particle scale the largest grain diameter, i.e. —1 mm (see FIG. 5C), these relations yield a fluidization velocity in the range of 0.2 to 0.5 m/s depending on particle sphericity and porosity of the (initially) packed bed. The volumetric flow associated with the current fluidization velocity (0.3 m/s) was approximately 6E-5 m$^3$/s. The temporal saturation condition of MOF-801 is controlled by comparing the absolute humidity level before and after the fluidized bed. As soon as the MOF-801 solid particulates are saturated, i.e. absolute humidity differences are within experimental uncertainties, the inlet temperature is periodically varied to initiate adsorption and desorption dynamics of the fluidized adsorbent cell for 10 consecutive operational cycles.

The invention claimed is:

1. A method of harvesting water in a power plant, the method comprising:
    providing a heat engine that has a waste heat gas output;
    providing a sorption/desorption device having an input and having a gas flow through it, wherein the sorption/desorption device has a sorption mode where it removes water vapor from the gas flow by sorption, wherein the sorption/desorption device has a desorption mode where it adds water vapor to the gas flow by desorption;
    cycling the sorption/desorption device between the sorption mode and the desorption mode at a cycle frequency f, wherein the input to the sorption/desorption device during the sorption mode is ambient air, wherein the input to the sorption/desorption device during the desorption mode is either i) a gas stream heated by the waste heat gas output or ii) the waste heat gas output;
    providing a heat exchanger configured to receive an output gas flow from the sorption/desorption device during the desorption mode, and configured to condense and recover liquid water from the output gas flow;

wherein the sorption/desorption device comprises a fluidized bed of a sorbent powder;

wherein the gas flow passes through the sorption/desorption device in a direction opposite to gravity so that the gas flow causes at least some particles of the sorbent powder to move upward levitated by drag force from the gas flow.

2. The method of claim 1, wherein the sorbent powder includes a metal-organic-framework (MOF) material.

3. The method of claim 1, wherein the cycle frequency f is 10 times per day or more.

* * * * *